Sept. 23, 1952 H. G. IRWIN 2,611,311
SMOKE ABSORBENT SMOKER
Filed Dec. 6, 1946 2 SHEETS—SHEET 1
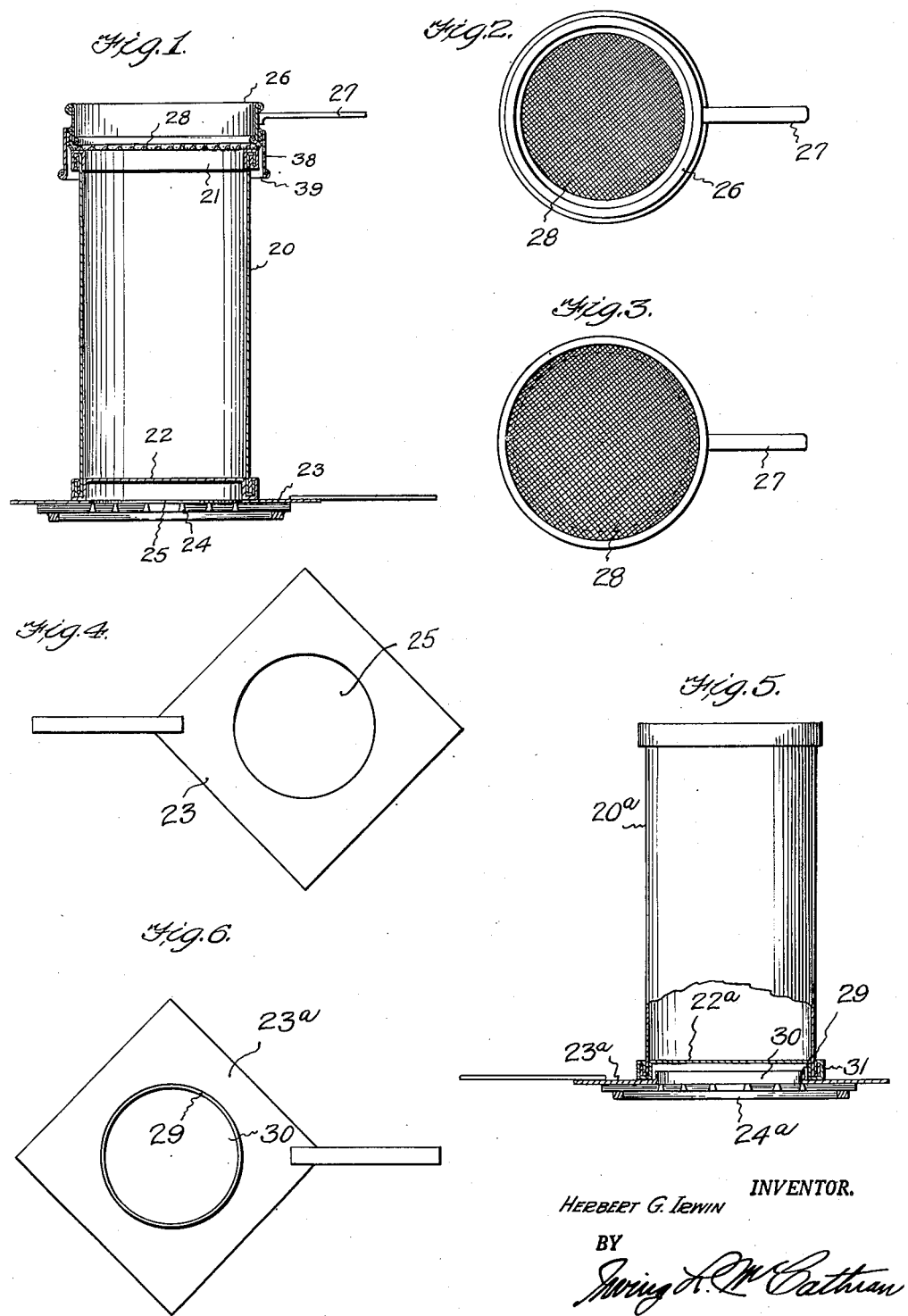
INVENTOR.
HERBERT G. IRWIN
BY
HIS ATTY.

Sept. 23, 1952 H. G. IRWIN 2,611,311
SMOKE ABSORBENT SMOKER
Filed Dec. 6, 1946 2 SHEETS—SHEET 2
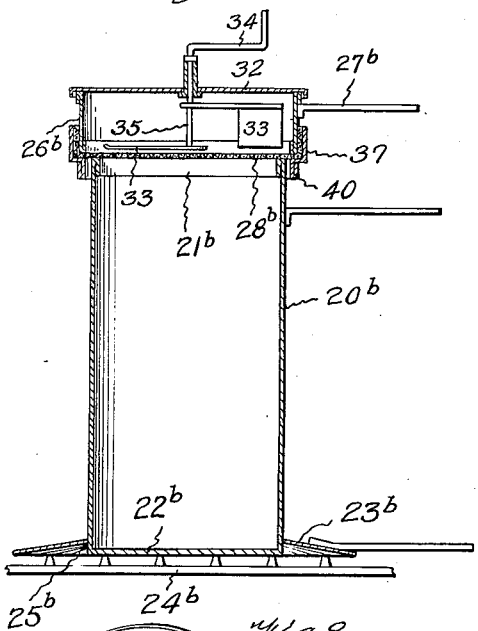
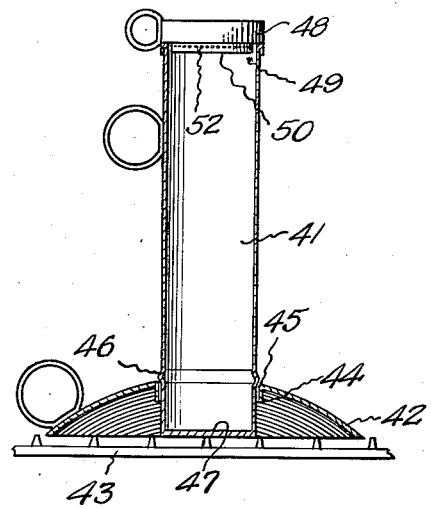
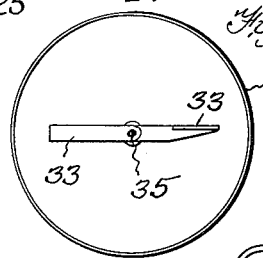
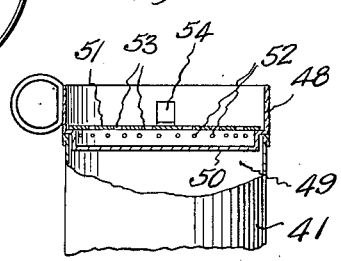
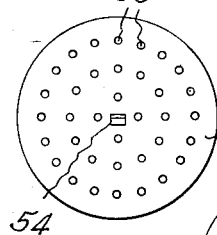
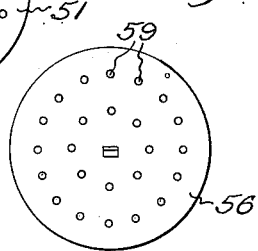
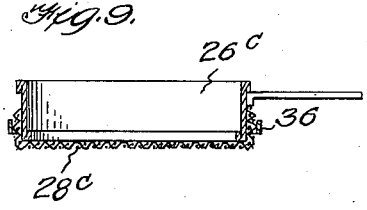
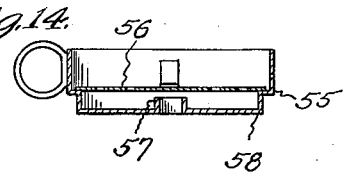
INVENTOR.
HERBERT G. IRWIN
BY
HIS ATTY.

Patented Sept. 23, 1952

2,611,311

UNITED STATES PATENT OFFICE 2,611,311

SMOKE ABSORBENT SMOKER

Herbert G. Irwin, Noble, La.

Application December 6, 1946, Serial No. 714,588

2 Claims. (Cl. 99—259)

This invention relates to smokers for use in producing meat flavoring materials, my principal object being to provide a smoker of this character especially developed for use in the kitchen.

A further object is the production of a simple and efficient means for quickly wood smoking on a cook stove or other heating element, various absorbent materials which are marketed in a dry and finely divided state for use in the kitchen and which materials are usually applied in the kitchen to fresh meat, fresh fowl and fresh fish preparatory to cooking same.

Another object is the production of a simple and efficient wood smoke-generating chamber which is adapted to stand over a cook stove burner or other heating element, and which is capable of being quickly charged with prepared smoke-generating material and emptied of residue from smoke-generating material.

A further object is the production of simple and efficient means for holding dry and finely divided smoke absorbent material in an exposed position to smoke in the mouth of the smoke-generating chamber.

Still another object is to provide a simple and efficient means for deflecting heat and gases from the cook stove burner or other heating element away from the mouth of the smoke-generating chamber.

In the drawings:

Figure 1 is a vertical sectional view through a smoke absorbent smoker constructed in accordance with the invention;

Figure 2 is a top plan view of the smoke absorbent holder;

Figure 3 is a bottom plan view of the smoke absorbent holder;

Figure 4 is a top plan view of the heat and gas deflector;

Figure 5 is a cross sectional view of a heat and gas deflector showing a modification in construction, the smoke-generating chamber being shown partly in section;

Figure 6 is a top plan view of the modified form of the deflector shown in Figure 5;

Figure 7 is a vertical sectional view through a smoke absorbent smoker of a modified form;

Figure 8 is a plan view of the under side of the cover of the smoke absorbent holder shown in Figure 7;

Figure 9 is a vertical sectional view through a smoke absorbent holder showing a modification in the bottom clamp band construction;

Figure 10 is a plan view of a smoke absorbent holder bottom blank;

Figure 11 is a vertical sectional view through a smoke absorbent smoker showing a still further modification in construction;

Figure 12 is an enlarged vertical sectional view through the smoke absorbent holder shown in Figure 11 and including a fragment of the smoke-generating chamber which is shown partly in section;

Figure 13 is a top plan view of the baffle disk of the smoke absorbent holder shown in Figure 12;

Figure 14 is a vertical sectional view through a smoke absorbent holder showing a still further modification in construction; and Figure 15 is a top plan view of the baffle disk of the smoke absorbent holder shown in Figure 14.

By referring to the drawings, it will be seen that 20 indicates an upright cylindrical smoke-generating chamber which is formed of sheet metal and is reinforced by means of a rim 21 extending around its mouth or upper end. A sheet metal bottom 22 is seamed to the lower end of the smoke-generating chamber 20, as shown in Figure 1. The chamber 20 stands on a flat heat and gas deflector 23 which is laid upon the grate 24, or other suitable support above a burner or heating element, not shown. This heating element may be of any type desired, such as a heating element of a cook stove, or an open fire of wood, charcoal, or coke. The heat deflector 23 in the present instance comprises a plate of metal which spreads over the heating element for some distance outwardly around the bottom end of the smoke-generating chamber, and the deflector is provided with a central opening 25 which is placed directly over the heating element. This opening 25 admits heat from the heating element directly to the under side of the bottom 22 of the smoke-generating chamber. The smoke absorbent holder is adapted to sit on the mouth 21 of the smoke-generating chamber and comprises a frame 26, preferably annular in shape and preferably formed of sheet metal. A handle 27 is carried by the frame 26 for lifting the holder to and from the smoke-generating chamber. A permeable bottom 28 is stretched over the frame 26 to cover the mouth 21 of the smoke-generating chamber, when the holder is placed thereon, as shown in Figure 1.

In the form shown in Figures 5 and 6, the heat and gas deflector 23ª is adapted to lie upon a support 24ª over a heating element (not shown). This deflector 23ª is provided with an upstanding flange 29 which is located around the heat passageway 30. The seam rim 31 at the bottom of the smoke-generating chamber 20ª surrounds the flange 29, which flange 29 is an aid in placing the generator bottom 22ª accurately over the heat passageway 30. This flange 29 also aids in keeping the generator bottom 22ª centered on the deflector while operating the smoker.

By referring to Figure 7, it will be noted that the smoke-generating chamber 20ᵇ is cylindrical in shape, and is formed of metal without seams.

While the device is in operation, it stands upon the stove grate 24b, with its bottom 22b directly over the stove burner or other heating element (not shown). The heat and gas deflector 23b is formed in the shape of a disk from sheet metal. This deflector 23b is dished somewhat, and is adapted to sit dished side down upon the stove grate 24b around the bottom end of the smoke-generating chamber 20b. The chamber 20b has its lower end seated in the central opening 25b of the heat deflector 23b. This opening 25b is only large enough for the bottom end of the smoke-generating chamber to pass freely therethrough. The smoke generating chamber 20b because of the structure illustrated and described, may be lifted from the burner or heating element to be emptied of residue and replaced on the heating element without necessarily moving the heat deflector. The smoke absorbent holder frame 26b is provided with a handle 27b and a permeable bottom 28b, which bottom is removably secured to the frame 26b. The frame 26b and the bottom 28b sit on the mouth 21b of the smoke-generating chamber 20b shown in Figure 7. This holder 26b is equipped with a removable metal cover 32, which cover carries a smoke absorbent agitator 33. This agitator 33 is adapted to revolve just above the bottom 28b. The smoke absorbent agitator 33 is manually actuated by a crank handle 34 on the upper end of the vertical shaft 35. The shaft 35 extends down through the cover 32 and the lower end of the shaft 35 carries suitable agitator blades, as shown in Figures 7 and 8, which blades turn with the shaft 35.

The permeable absorbent holder bottom 28 shown in Figure 1, is formed of suitable material, preferably a woven cotton cloth which is meshed only close enough to hold finely-divided smoke absorbent material. The bottom 28 preferably is cut in round blanks such as is shown in full lines in Figure 10, although a square blank, as indicated in dotted lines, may be used without departing from the spirit of the invention. The cloth of a suitable or desired shape is clamped upon the absorbent holder frame 26 by a suitable clamp, preferably a metal band clamp 38, as indicated in Figure 1. The band is pressed on the smoke absorbent holder frame 26 over the marginal edge of the cloth blank thereby binding the marginal edge of the cloth blank against the outside of the absorbent holder frame 26.

The bottom 28b shown in Figure 7, is secured to the frame 26b by means of a band 37, in a manner similar to that described above. The bottom 28c is also secured to the frame 26c shown in Figure 9, in a similar manner, by means of a band 36.

The band clamp 38 is of a sufficient width to provide a skirt 39 to extend down around the mouth of the smoke-generating chamber 20 to aid in accurately placing the smoke absorbent holder 26 on the mouth of the smoke-generating chamber 20. This skirt also prevents the smoke absorbent holder 26 from slipping laterally out of place when the absorbent in the holder is being stirred or agitated during the period of exposure to smoke from the smoke-generating chamber 20.

The smoke absorbent smoker shown in Figure 11 is designed initially for producing meat flavoring material in small quantities such as smoking a table-spoon full of absorbent material at a time. In this form I provide a smoke-generating chamber 41 which is relatively small in diameter and which is supported in an upstanding position over a heating element (not shown) by the heat deflector 42. The deflector 42 is cupola-shaped and is adapted to sit on the grate 43. The deflector 42 is formed of sheet metal and is provided with a depending skirt 44 around the central opening 45, in which the smoke-generating chamber is supported. The opening 45 and skirt 44 are large enough only in diameter to receive the lower end of the chamber 41 and to permit the lower end of the chamber to freely pass through the opening 45, and the skirt 44 extends downwardly far enough to hold the smoke-generating chamber in an upstanding position. The smoke-generating chamber 41 has an outwardly projecting stop shoulder or bead 46 which abuts the top of the heat deflector to limit the distance the bottom 47 of the smoke-generating chamber may approach the heating element. The stop shoulder 46 is formed preferably annular in shape and by expanding the wall of the smoke-generating chamber circumferentially. The smoke absorbent holder 48, shown in Figures 11 and 12, is formed of metal in the shape of a cup and sits on the rim of the mouth 49 of the smoke-generating chamber 41. The bottom 50 of the holder is depressed somewhat to fit with some play into the mouth 49 of the smoke-generating chamber 41. This depressed portion 50 of the holder bottom 48 aids in accurately placing the holder 48 in position and prevents the holder from slipping laterally out of place when the smoke absorbent material is put in the holder or while the material is being stirred into place below the baffle disk 51. As shown in detail in Figure 12, the absorbent holder bottom has a series of small perforations 52 formed around the edge of the depression 50, to admit smoke from the smoke-generating chamber 41 into the absorbent holder under the baffle disk 51. This disk 51 is spaced a short distance above the depressed bottom 50. As shown in Figure 13, the baffle disk 51 is provided with a plurality of comparatively large perforations 53 which are preferably widely-spaced from each other and constitute passageways for smoke absorbent material to fall through and lodge upon the bottom 50 in spaced piles under the baffle 51. The baffle 51 is placed in the holder and is removed therefrom when desired by the thumb-grip 54.

The modified type of absorbent holder 55 shown in Figure 14 is interchangeable with the holder 48 on the mouth 49 of the smoke-generating chamber 41. Smoke from the smoke-generating chamber comes into the holder 55 under the center of the baffle disk 56 through a curbed passageway 57 which is located at the center of the holder bottom 58. The baffle disk 56 is spaced a short distance above the bottom 58 and is removable from the holder 55. As will be noted by considering Figure 15, the spaced perforations 59 constitute passageways to permit smoke absorbent material to fall upon the bottom 58 of the holder 55 in spaced small piles around the curbed smoke passageway 57.

The heat deflectors 23, 23a, 23b, and 42, in the various forms, are provided to protect the absorbent holder from the excess heat which escapes from a heating element, over which the smoke-generating chamber is stood in operation. A large amount of heat (from the heating element) which is not taken into the smoke-generating chamber and which would go directly up the outside of the smoke-generating chamber and thus heat the absorbent holder, is turned or spread outwardly by the heat deflector.

Any prepared material or a mixture of various materials which when heated, or destructively heated, emits aroma, fumes or smoke, which is suitable or desirable for flavoring food, is a desirable smoke-generating material for use in operating this invention. Chips, coarse and fine fragments or fibers of various woods and plants such as hickory, oak, cypress, the cob of corn, the dried butt of matured sugar cane, the fiber of hemp and the kernel of the peanut, corn, wheat and barley are especially recommended. Also the shell of various nuts of which the pecan nut, the English walnut and the hazelnut are widely distributed for the holiday season. The shell of these nuts after the kernel is extracted is a prepared smoke-generating material which may be used in preparing a smoke flavoring application for the holiday game or other fresh meat.

Any of the powdered, granulated, or flake materials which are usually kept on hand in a dry condition for use in the kitchen in preparing fresh meats, including chopped or ground meat, also fresh fowl or fresh fish to be cooked, are suitable smoke absorbents for use in the smoke absorbent holders shown in the drawings and described herein. Also a dry mixture of two or more of such materials form a suitable smoke absorbent for the purpose of operating this invention. A dry mixture of granulated salt and wheat flour forms a smoke absorbent of mixed materials which when smoked with hickory wood smoke or other suitable smoke constitutes a tasty seasoning for cooking on steaks, or cooking on chops or chicken, or cooking on quail or other wild fowl. Also, granulated salt with or without granulated or powdered sugar mixed therewith, is a smoke absorbent which when smoked with a suitable smoke is desirable for preparing salt pork. Cornmeal or cracker meal is a smoke absorbent which when smoked lightly with a suitable or desirable smoke and fried on fresh fish adds a pleasing savor.

In operating the absorbent smoker, the desired amount of smoke-generating material is put in the smoke-generating chamber on the bottom thereof and the bottom of the smoke generating chamber with the heat deflector in place is heated to the desired temperature over a suitable heating element to generate aroma, fumes or smoke from the charge of generating material. The smoke absorbent holder with some smoke absorbent spread upon the permeable bottom thereof is placed on the mouth of the smoke-generating chamber. Smoke from the smoke-generating chamber passes upwardly through the bottom of the smoke absorbent holder and through the smoke absorbent contained therein and some of the smoke is absorbed and condensed to a thin smoke tar deposit on the particles which form the absorbent. It is only necessary to expose the absorbent a minute or so when it is being stirred while being smoked. The smoke absorbent is then ready for use as a meat flavoring material.

A measured amount of smoke absorbent is put in the holders shown in Figures 12 and 14. The absorbent is then stirred so that it will fall through the spaced perforations of the baffle disk and pile upon the bottom of the holder, thereby forming a plurality of small spaced piles of smoke absorbent material on the pattern of the perforations in the baffle disk. Enough absorbent is put in the holder to form these piles upwardly and fill all the perforations in the baffle disk. Since the piles of absorbent under the baffle disk are spaced apart there is some space around each pile for the circulation of smoke from the smoke-generating chamber. When the absorbent so arranged on the bottom of the holder is exposed to smoke in the mouth 49 of the smoke-generating chamber 41, each small pile of absorbent takes on some smoke which is rapidly condensed to a thin smoke tar film or fine deposit on the particles which form the absorbent. A few minutes exposure to smoke is sufficient for most meat flavoring purposes and thus the smoke-enriched absorbent is ready for use.

When a very high smoke flavor strength in the absorbent is desired, the smoke-generating chamber is recharged and the absorbent is re-exposed.

What I claim is:

1. A smoke absorbent smoker including a smoke generating chamber having a heat absorbent bottom for supporting a quantity of smoke generating material over an external heating element, said smoke generating chamber having a top rim defining a mouth for receiving smoke generating material into the smoke generating chamber and emitting smoke from the smoke generating chamber, said rim affording a seat for a smoke absorbent container having a permeable bottom; a smoke absorbent container having a permeable bottom for supporting a quantity of smoke absorbent and covering the mouth of said smoke generating chamber with the outer margin of said permeable bottom seated on the rim of said mouth; and a heat deflector for covering said heating element around said smoke generating chamber, said heat deflector having an outer surrounding edge whereby excess heat from said heating element is admitted upwardly beyond the smoke absorbent container seated on the mouth of the smoke generating chamber.

2. A smoke absorbent smoker including a smoke generating chamber having a heat absorbent bottom for supporting a quantity of smoke generating material over an external heating element, said smoke generating chamber having a top rim defining a mouth for receiving smoke generating material into the smoke generating chamber and emitting smoke from the smoke generating chamber, said rim affording a seat for a smoke absorbent container having a permeable bottom; and a smoke absorbent container having a permeable bottom for supporting a quantity of smoke absorbent and covering the mouth of said smoke generating chamber with the outer margin of said permeable bottom seated on the rim of said mouth.

HERBERT G. IRWIN.

REFERENCES CITED

The following references are of record in the file of this patent:

UNITED STATES PATENTS

| Number | Name | Date |
| --- | --- | --- |
| 1,116,135 | Sebessy et al. | Nov. 3, 1914 |
| 1,214,992 | Boleratz | Feb. 6, 1917 |
| 1,280,054 | Loyland | Sept. 24, 1918 |
| 1,460,975 | Miller et al. | July 3, 1923 |
| 1,536,692 | Scheu | May 5, 1925 |
| 2,072,364 | Gray et al. | Mar. 2, 1937 |
| 2,099,788 | Ames | Nov. 23, 1937 |
| 2,168,388 | Bemis | Aug. 8, 1939 |
| 2,262,910 | Aller | Nov. 18, 1941 |